United States Patent
Klink et al.

Patent Number: 5,543,244
Date of Patent: Aug. 6, 1996

[54] ELECTROCHEMICAL STORAGE DEVICE

[75] Inventors: Rainer Klink, Kernen im Remstal; Johann German, Weinstadt, both of Germany

[73] Assignee: Deutsche Automobilgesellschaft mbH, Germany

[21] Appl. No.: 162,503

[22] Filed: Dec. 6, 1993

[30] Foreign Application Priority Data

Dec. 5, 1992 [DE] Germany .......................... 42 41 037.1

[51] Int. Cl.$^6$ ................................. H01M 10/34
[52] U.S. Cl. ................................. 429/57; 429/163
[58] Field of Search .................. 429/57, 148, 72, 429/183, 177, 58, 59, 163, 143

[56] References Cited

U.S. PATENT DOCUMENTS

| | | |
|---|---|---|
| 1,538,146 | 5/1925 | Toomay . |
| 2,385,127 | 9/1945 | Carlile ........................... 429/148 |
| 3,023,258 | 2/1962 | Peters ............................. 429/59 |
| 3,438,812 | 4/1969 | Cherney et al. .................. 429/59 |
| 5,045,086 | 9/1991 | Juergens ........................ 29/623.1 |

FOREIGN PATENT DOCUMENTS

| | | |
|---|---|---|
| 0304512A3 | 3/1989 | European Pat. Off. . |
| 642018 | 5/1928 | France . |
| 1011491 | 7/1957 | Germany . |
| 1299057 | 7/1969 | Germany . |
| 84873 | 1/1980 | Japan . |
| 61-4363 | 6/1986 | Japan . |

Primary Examiner—George Fourson
Assistant Examiner—C. Everhart
Attorney, Agent, or Firm—Evenson, McKeown, Edwards & Lenahan

[57] ABSTRACT

An electrochemical storage device having a metallic, gas-tight storage device housing in which an electrode stack formed from a plurality of electrode plates stacked on one another is accommodated. Arranged between the storage device housing and the electrode stack is a box-like stack insulation which is made from an electrically insulating material and which surrounds the electrode stack on the sides which come to bear directly against the housing interior. For the purpose of reliable flow of the quantity of gas occurring during operation, there are arranged on those circumferential sides of the stack insulation towards which the narrow sides of the electrode plates point material protuberances which cross over the narrow sides of the electrode plates and which are spaced apart from one another in order to form gas conduits.

10 Claims, 4 Drawing Sheets

5,543,244

ELECTROCHEMICAL STORAGE DEVICE

BACKGROUND AND SUMMARY OF THE INVENTION

The present invention relates to an electrochemical storage device having a metallic, gas-tight storage device housing in which an electrode stack formed from a plurality of electrode plates stacked on one another is accommodated, having a box-like stack insulation which is arranged between the storage device housing and the electrode stack, is made from an electrically insulating material which surrounds the electrode stack, including those sides of are adjacent electrode stack which are adjacent narrow sides of the electrode plates.

The fundamental electrochemical storage device of the generic type has a metallic, gas-tight storage device housing in which an electrode stack formed from a plurality of electrode plates stacked on one another is accommodated, with recombiners being arranged between individual electrode plates of the same polarity, for example between the negative electrode plates, and separators being arranged between the electrode plates of different polarity. The electrode plates are connected via their respective current-collecting lug to a terminal yoke which, for its part, is connected in an electrically conductive fashion to the terminal pillar, which leads outwards. Arranged between the storage device housing and the electrode stack is a stack insulation which is made from an electrically insulating material and which surrounds the electrode stack completely at the sides and at the bottom in order to avoid short circuiting of electrode plates of different polarity via the metallic storage device housing. A gas-conducting network is arranged between the stack insulation and the electrode stack so that in the event of a high incidence of gas these gases can flow virtually unimpeded inside the electrochemical storage device. The gas conducting network is a strip of a plastic network which is guided from a side wall of the electrode stack arranged transverse to the flat sides of the electrode plates via the bottom of the electrode stack to the opposite side wall of the electrode stack, so that the gas-conducting network is arranged on the lateral rims of the electrode plates at which the gas emerges. In the region of the bottom of the electrode stack, the gas conducting network is followed in the direction of the housing bottom by a separator, then by a catalyst member arranged in a frame and subsequently by the bottom of the stack insulation.

The gas-conducting network is attached during the manufacture of the electrochemical storage device to the relevant sides of the stack insulation, for example by means of spot welding. The bottom of the stack insulation is fitted in advance with the catalyst frame, the catalyst plate and the separator. Subsequently, the fitted stack insulation is arranged around the electrode stack provided with the cover and the terminal pillars and inserted jointly into the storage device housing, which is open on the cover side, and the housing is sealed in a gas-tight fashion.

This type of production requires many individual parts and in terms of the production cycle is bound up with many steps, as a result of which, inter alia, the costs for the production of an electrochemical storage device are high. In order for only a slight play to occur between the individual components of the electrochemical storage device, and in order for the electrode stack to have effective thermal contact with the storage device housing, the individual components of the insulation must further be produced with very narrow tolerances, so that the production costs for the electrochemical storage device are increased once more.

Such electrochemical storage devices are generally operated with a partial vacuum, so that the sides of the storage device housing which are assigned to the gas conducting networks press the gas-conducting network against the lateral rims of the electrode plates. As a result, for example, individual gas-conducting conduits can be squeezed off or sealed by a displacement of the gas-conducting network, and/or the gas-conducting network can be pressed into the rims of the electrode plates and/or of the separators, as a result of which electrode plates of different polarity can be short circuited. In both cases, the quality of the electrochemical storage device is lowered.

An object of the present invention is to improve the fundamental storage device of the above-described generic type so that it can be produced more cost effectively in conjunction with high quality and a lower expenditure.

This and other objects are achieved by the present invention which provides an electrochemical storage device comprising a metallic, gas-tight storage device housing, an electrode stack formed from a plurality of electrode plates stacked on one another accommodated in the storage device housing, a box-like stack insulation between the storage device housing and the electrode stack, made from an electrically insulating material and surrounding the electrode stack at the sides of the electrode stack which would bear directly against the housing interior, and gas conduits arranged between the stack insulation and the electrode stack on peripheral sides of the electrode stack formed by the peripheral edges of the electrode plates, to form gas outlet sides, wherein the gas conduits are material protuberances in the stack insulation, are spaced apart from one another and cross over the narrow sides of the electrode plates.

Due to the material protuberances which are impressed into the stack insulation and project towards the electrode stack and are spaced apart from one another, a separate gas-conducting network becomes dispensable, and this is bound up with a saving in costs and a higher production accuracy. In addition, the working steps relating to the gas conducting network are dispensed with, making the production process more simple and less expensive. Moreover, the gas conduits extending between the material protuberances, as previously happened with the lines of the gas-conducting network, can no longer be displaced and thereby sealed. The advantage of the invention comes to light particularly clearly when looking at the cost advantage, which amounts here to more than one to ten by comparison with the old design.

Other objects, advantages and novel features of the present invention will become apparent from the following detailed description of the invention when considered in conjunction with the accompanying drawings.

DETAILED DESCRIPTION OF THE DRAWINGS

Figure 1:
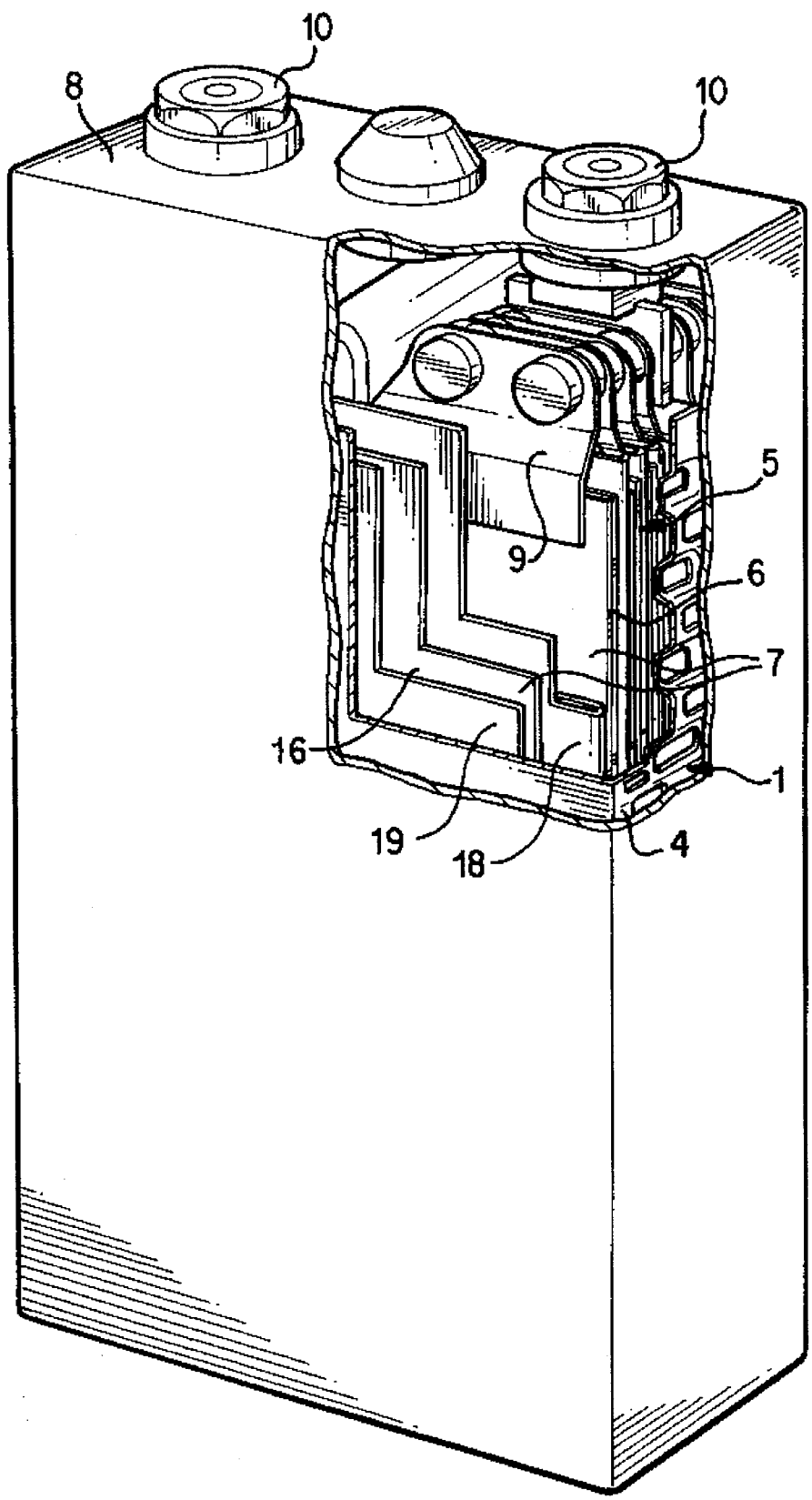
FIG. 1 shows an electrochemical storage device constructed in accordance with an embodiment of the present invention with a partially broken away storage device housing.

An electrochemical storage device according to an embodiment of the present invention is shown in FIG. 1 with a partially removed storage device housing 8. An electrode stack 5 formed from a plurality of electrode plates 7 stacked on one another is accommodated in the metallic and gas-tight storage device housing 8. Separators 18 are arranged between the individual electrode plates 7. The electrode plates 7 are connected in an electrically conductive fashion via their current-collecting lug 9 to the terminal pillars 10, which lead outwards of the housing 8.

Figure 8:
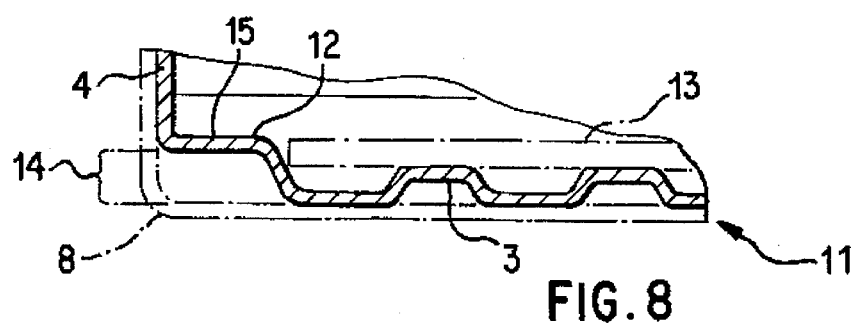
FIG. 8 shows an enlargement of a section of the detail VIII according to FIG. 4 in the region of the edge between a gas outlet side and the bottom.

Arranged between the storage device housing 8 and the electrode stack 5 is a box-like stack insulation 1 which is made from an electrically insulating material and which surrounds the electrode stack 5 on the sides which come to bear directly against the inside of the housing 8. Short circuiting of electrode plates 7 of different polarity via the metallic storage device housing 8 is avoided with the aid of the stack insulation 1. Gas conduits (as described hereinafter) are provided between the stack insulation 1 and the electrode stack 5 so that in the event of a high incidence of gas these gases can flow virtually unimpeded inside the electrochemical storage device. The gas conduits are located on those peripheral sides of the electrode stack 5 formed by the peripheral edges 6 of the electrode plates 7 point. These sides of the stack insulation 1 are referred to below for brevity as gas outlet sides. The gas outlet sides are subdivided in the case of cuboid storage device housings 8 and electrode stacks 5 into the lateral gas outlet sides 4, 4' assigned to the shell of the stack insulation 1, and into the bottom 11 of the stack insulation 1 (see FIG. 2). Below the bottom of the electrode stack 5 is a separator, a catalyst plate 13 enclosed in a frame-like fashion and, subsequently, the bottom 11 of the stack insulation 1 (see FIG. 8).

Figure 2:
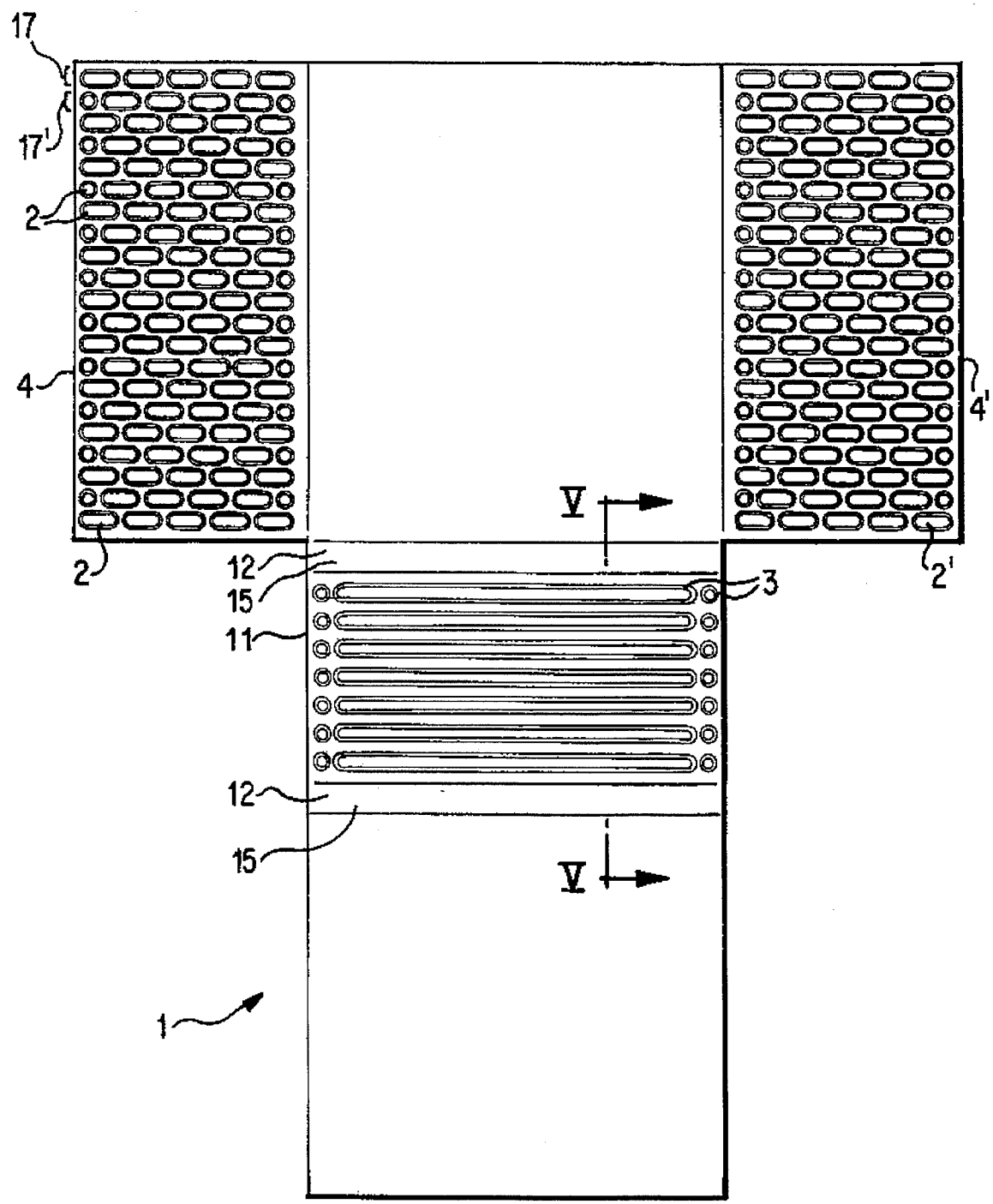
FIG. 2 shows a folded-out plate of a cuboid, box-like stack insulation constructed in accordance with an embodiment of the present invention.

The folded-out plate of the cuboid, box-like stack insulation 1, which is appropriately produced from polypropylene or polyethylene, is represented in FIG. 2. The T-shaped plate has two flat broad sides, which are assigned to the flat sides 16 of the electrode plates 7, two gas outlet sides 4, 4', which are arranged on the first broad side and assigned to the peripheral edges 6 of the electrode plates 7, and a bottom side, which is arranged between the two broad sides and forms the bottom 11. In this embodiment, the stack insulation 1 is provided as a plate, thereby ensuring that space is saved in supply and storage. Furthermore, the T-shaped plate is advantageous because all that is required to assemble the electrode stack 5 is to fold up the gas outlet sides 4, 4' and subsequently merely to insert the individual parts of the electrode stack 5, which are already fixed in the direction of the gas outlet sides 4, 4'.

Another embodiment for the design of the plate for the stack insulation arranges on both broad sides assigned to the flat sides 16 of the electrode plates 7 parts which when the stack insulation is folded together overlaps laterally.

Figure 3:
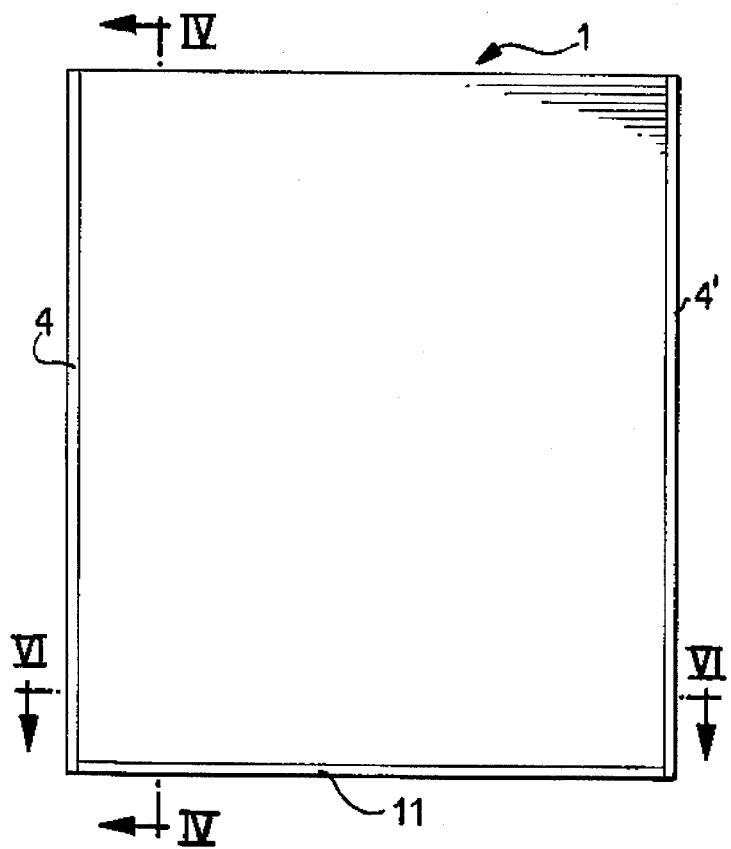
FIG. 3 shows a plan view of a stack insulation according to FIG. 2 which has been folded together.
Figure 7:
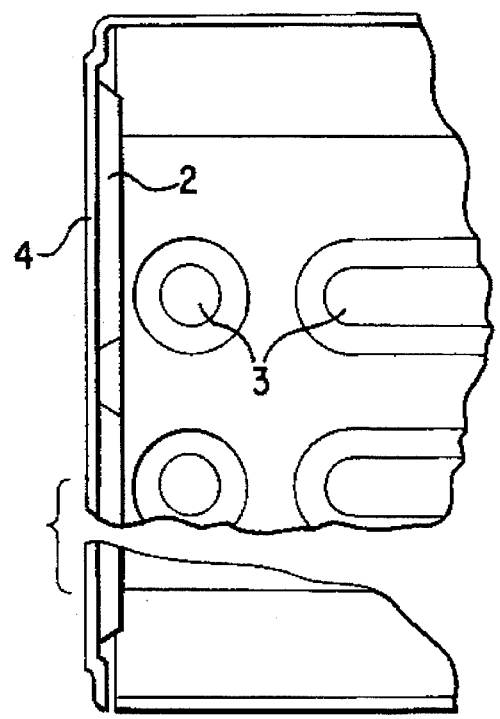
FIG. 7 shows an enlargement of a section of the detail VII from FIG. 6 of a corner in the region of the bottom.

In order to ensure simple folding of the plate to form the box-like stack insulation 1 represented in FIG. 3, the plate is scored in the region of the edges between two sides, or has a material taper which forms a film hinge. The two gas outlet sides 4, 4' are dimensioned such that when the stack insulation 1 is folded they occupy the entire inner width of the storage device housing 8. The subregions of the plate which form the bottom 11 and the free broad side are narrower by the dimension of the material thickness of the gas outlet sides 4, 4'. As a result, when the stack insulation 1 is folded the free broad side comes to lie between the two gas outlet sides 4, 4' (see FIG. 7). This design of the plate prevents the uppermost parts of the electrode stack 5 from being laterally displaced and being able to form an electrical short circuit with the storage device housing 8.

Figure 4:
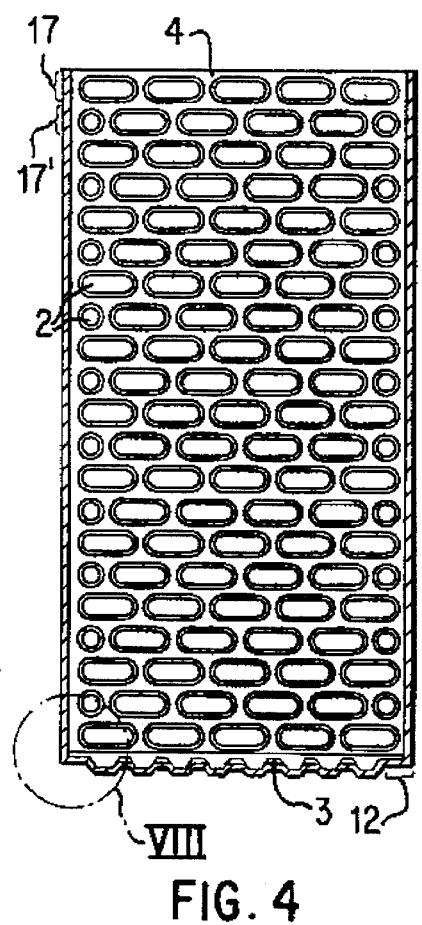
FIG. 4 shows a section along the plane IV—IV in FIG. 3.
Figure 5:
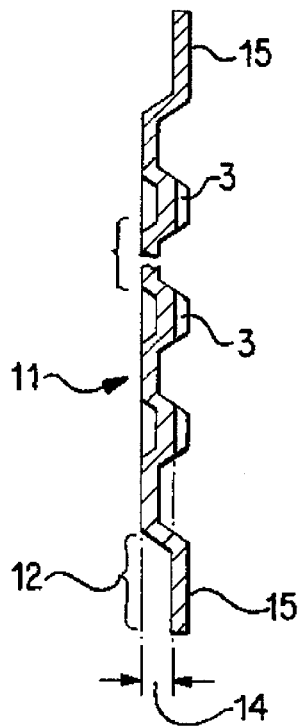
FIG. 5 shows a section along the plane V—V in FIG. 2.
Figure 6:
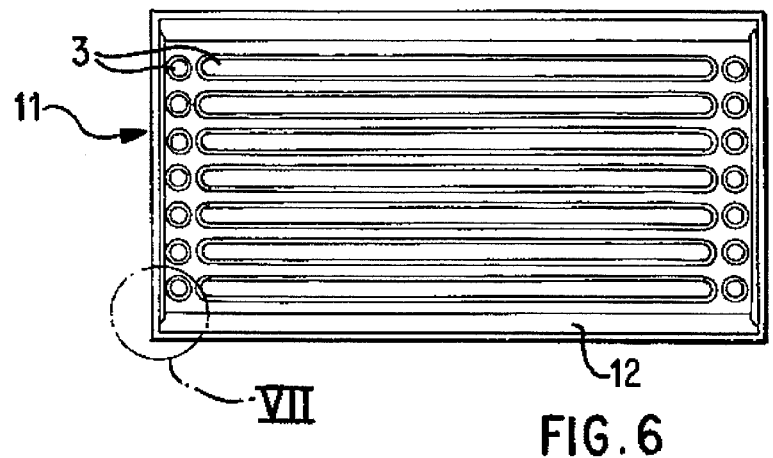
FIG. 6 shows a section along the plane VI—VI in FIG. 3.

The two lateral gas outlet sides 4, 4' of the stack insulation have material protuberances 2, 2' which are spaced apart from one another extend across the peripheral edges 6 of the electrode plates 7. The free spaces arranged between the material protuberances 2, 2' form gas conduits for the gas produced during operation of the storage device. It is appropriate for the lateral material protuberances 2, 2' to be constructed as a row 17, 17' of knobs. So that the separators and the electrode plates 7 cannot drift out of the electrode stack 5 into the gaps between two adjacent knob-like material protuberances 2, 2' but are held securely in the electrode stack 5 and thus the gas conduits produced are held open, the knob-like material protuberances 2, 2', arranged on the lateral gas outlet sides 4, 4', of adjacent rows 17, 17' of knobs are, as shown in FIG. 4, arranged offset relative to one another and extend at least over two electrode plates 7. Moreover, the material protuberances 2, 2' are constructed flat in the region of their contact with the electrode stack 5, so that the inviolability of the narrow sides 6 of the electrode plates 7, the recombiners 18 and the separators 17 is ensured. A further advantage of the knob-like design of elongated material protuberances 2, 2' is that it allows the embossing tool for producing the material protuberances 2, 2' to be adapted in a simple way to different formats.

On the longitudinal edges of its bottom 11, the cuboid stack insulation 1 has an indentation 12 with dimensions of the inside outline that correspond to the corresponding external dimensions of the catalyst plate 13 to be inserted. It is advantageous for the indentation 12 to be chamfered or stepped on the outside in a way which facilitate the insertion of the box-like stack insulation 1 into the storage device housing 8. Measured from the point of the highest elevation of the material protuberances 3 on the bottom side to the upper rim 15 of the indentation 12, the depth 14 of the indentation 12 is approximately equal to the material thickness of the catalyst plate 13, so that this upper rim 15 forms the support on the rim side for the separator inserted between the electrode stack 5 and the catalyst plate 13. A separator and the catalyst plate 13 are thus arranged between the material protuberances 3 on the bottom side and the bottom of the electrode stack 5, so that the electrode plates 7 cannot sink on the bottom side into these material protuberances 3. Since the gas flow on the bottom side takes place largely parallel to the narrow sides 6 of the electrode plates 7, the material protuberances 3 on the bottom side are advantageously arranged parallel to the flat sides 16 of the electrode plates 7 and extend without interruption to approximately 75% to 95% of the total extent of the bottom 11 of the stack insulation 1. This design of the material protuberances on the bottom side is, in addition, also less expensive to produce. However, as in the case of the gas outlet sides 4, 4', it is also possible to select round or elongated shapes of knob, and also rhombic or cuboid ones. Although the described arrangement of the catalyst plate 13 is decidedly advantageous with reference to the gas paths, it can be removed to another location if, for example, required for construction reasons. This concerns, for example, the gas outlet sides 4, 4', there then being a need in this case for their lateral material protuberances 2, 2' to be adapted in shape and height to these new conditions.

In certain embodiments, polypropylene is used as the material for the stack insulation 1, since it is light, very resistant to the temporarily hot electrolytes (approximately 50% strength KOH), can be effectively processed and is relatively inexpensive, and since it furthermore has an extremely low water absorption.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Electrochemical storage device comprising:
   a metallic, gas-tight storage device housing;
   an electrode stack formed from a plurality of electrode plates stacked on one another accommodated in the storage device housing;
   a box-like stack insulation between the storage device housing and the electrode stack, made from an electrically insulating material and surrounding the electrode stack at the sides of the electrode stack which would bear directly against the housing interior;
   a plurality of protuberances arranged in portions of said stack insulation, adjacent peripheral sides of said electrode stack formed by peripheral edges of said electrode plates, hereinafter referred to as gas outlet sides, which protuberances project toward, contact and extend across said peripheral edges of said electrode plates; and
   gas conduits formed by free spaces between said protuberances in the stack insulation, said free spaces being in fluid communication with said gas outlet sides of said electrode stack.

2. Electrochemical storage device according to claim 1, wherein the stack insulation has a bottom side that is at least one of chamfered and stepped so as to facilitate insertion into the storage device housing.

3. Electrochemical storage device according to claim 1, wherein the material protuberances are flat in a region of contact with the electrode stack.

4. Electrochemical storage device according to claim 1, wherein the electrode stack is cuboid, the storage device housing has current-collecting lugs, arranged on one end, and terminals at a gas outlet side of the stack insulation, and wherein the bottom side has an indentation with outline dimensions corresponding to the external dimensions of a catalyst plate to be inserted.

5. Electrochemical storage device according to claim 4, wherein the depth of the indentation to an upper rim of the indentation is greater than or equal to the material thickness of the catalyst plate to be inserted as measured from a point of the highest elevation of the material protuberances on the bottom side to the upper rim of the indentation.

6. Electrochemical storage device according to claim 4, wherein the stack insulation has material protuberances on the bottom side which are arranged parallel to the flat sides of the electrode plates, which extend virtually over the entire bottom and which are constructed without interruption over approximately 75% to 95% of the total extent of the bottom side.

7. Electrochemical storage device according to claim 4, wherein the material protuberances which cross over the narrow sides of the electrode plates of the lateral gas outlet sides are a row of knobs, and wherein the knob-like material protuberances of adjacent rows of knobs are offset relative to one another.

8. Electrochemical storage device according to claim 7, wherein the knob-like material protuberances of the lateral gas outlet sides extend at least over two electrode plates.

9. Electrochemical storage device according to claim 1, wherein the stack insulation is polypropylene.

10. Electrochemical storage device according to claim 1 wherein said protuberances comprise a matrix arrangement of discrete protuberances, said protuberances having a longitudinal axis which is oriented across said peripheral edges of said electrode plates, and wherein said free spaces include gaps between adjacent protuberances along said longitudinal axis.

* * * * *